US012698096B2

(12) United States Patent
Shen et al.

(10) Patent No.: US 12,698,096 B2
(45) Date of Patent: Aug. 4, 2026

(54) UNMANNED AIRCRAFT TRACTION CONTROL SYSTEM WITHOUT TRACTION ROD AND INTELLIGENT TRACTOR

(71) Applicant: Shanghai Longyuhui Technology Co., Ltd., Shanghai (CN)

(72) Inventors: Binglong Shen, Nantong (CN); Wenhui Meng, Nantong (CN); Hongyu Wang, Nantong (CN)

(73) Assignee: Shanghai Longyuhui Technology Co., Ltd., Shanghai (CN)

( * ) Notice: Subject to any disclaimer, the term of this patent is extended or adjusted under 35 U.S.C. 154(b) by 0 days.

(21) Appl. No.: 18/874,884

(22) PCT Filed: Dec. 26, 2023

(86) PCT No.: PCT/CN2023/141963
§ 371 (c)(1),
(2) Date: Dec. 13, 2024

(87) PCT Pub. No.: WO2024/149059
PCT Pub. Date: Jul. 18, 2024

(65) Prior Publication Data
US 2025/0368354 A1     Dec. 4, 2025

(30) Foreign Application Priority Data
Jan. 9, 2023   (CN) .......................... 202310028875.1

(51) Int. Cl.
*B64F 1/228*         (2024.01)
*B64F 1/00*          (2024.01)
(Continued)

(52) U.S. Cl.
CPC .............. *B64F 1/228* (2013.01); *B64F 1/002* (2013.01); *B64F 1/227* (2013.01); *G05D 1/437* (2024.01); *G08G 5/26* (2025.01)

(58) Field of Classification Search
CPC .......... G05D 1/437; G08G 5/26; B64F 1/228; B64F 1/002; B64F 1/227; B64F 1/10; B64F 1/18; B64F 1/20; B64F 1/223; B64F 1/225
See application file for complete search history.

(56) References Cited

U.S. PATENT DOCUMENTS 10,569,904 B2 * 2/2020 Halsey ..................... B64F 1/352
11,614,513 B2 * 3/2023 Salter ...................... G01S 7/295
342/27

(Continued)

FOREIGN PATENT DOCUMENTS

CN        107703944  A      2/2018
CN        109292107  A      2/2019
(Continued)

OTHER PUBLICATIONS

Chinese Application No. 202310028875.1 First Office Action dated Jul. 19, 2024.
(Continued)

*Primary Examiner* — Joshua J Michener
*Assistant Examiner* — Cindi M Curry
(74) *Attorney, Agent, or Firm* — Tutunjian & Bitetto, P.C.

(57)     ABSTRACT

An unmanned aircraft traction control system without a traction rod and an intelligent tractor relate to the technical fields of aircraft ground motion and man-machine coordination. The traction control system includes an aircraft light identification and induction module, a main sensing system module, an aircraft sound identification and induction module and a control module which are arranged on the tractor. When the tractor and an aircraft carry out a wheel holding operation, the aircraft light identification and induction module, the main sensing system module and the aircraft sound identification and induction module acquire a brightness signal of an aircraft nose landing gear taxi light, an (Continued)

aircraft turning signal, an aircraft resistance signal and an aircraft horn signal autonomously transmitted by a pilot. The purpose that a pilot autonomously controls the tractor to pull an aircraft to an aircraft parking position or a designated taxiway position is realized through the above signals.

16 Claims, 3 Drawing Sheets

(51) Int. Cl.
    *B64F 1/227*        (2024.01)
    *G05D 1/437*       (2024.01)
    *G08G 5/26*        (2025.01)

(56)             References Cited

U.S. PATENT DOCUMENTS

| | | | |
|---|---|---|---|
| 12,260,767 B2 * | 3/2025 | Muralidharan | G08G 5/51 |
| 2010/0140392 A1 | 6/2010 | Perry et al. | |

| | | | |
|---|---|---|---|
| 2012/0061521 A1 * | 3/2012 | Perry | B64F 1/227 |
| | | | 244/175 |
| 2015/0051757 A1 * | 2/2015 | Cox | G08G 5/21 |
| | | | 701/3 |
| 2019/0027051 A1 * | 1/2019 | Veronesi | G08G 5/20 |
| 2021/0261270 A1 * | 8/2021 | Heafitz | B64D 47/02 |
| 2024/0101274 A1 * | 3/2024 | Roebuck | B60L 50/66 |

FOREIGN PATENT DOCUMENTS

| | | | | |
|---|---|---|---|---|
| CN | 111402874 A | | 7/2020 | |
| CN | 112009714 A | * | 12/2020 | B64F 1/228 |
| CN | 116834962 A | | 10/2023 | |

OTHER PUBLICATIONS

International Search Report from PCT/CN2023/141963 Feb. 3, 2024, 2 pgs.

* cited by examiner

UNMANNED AIRCRAFT TRACTION CONTROL SYSTEM WITHOUT TRACTION ROD AND INTELLIGENT TRACTOR

CROSS-REFERENCE TO RELATED APPLICATIONS

This application is a national stage application of International Patent Application No. PCT/CN2023/141963, filed Dec. 26, 2023, which claims priority to Chinese Patent Application No. 202310028875.1, filed with the Chinese Patent Office on Jan. 9, 2023 and entitled "UNMANNED AIRCRAFT TRACTION CONTROL SYSTEM WITHOUT TRACTION ROD AND INTELLIGENT TRACTOR", which is incorporated herein by reference in its entirety.

TECHNICAL FIELD

The present disclosure relates to the technical fields of aircraft ground motion and man-machine coordination, in particular to an unmanned aircraft traction control system without a traction rod and an intelligent tractor.

BACKGROUND

Before landing on a gallery bridge and taking off, an aircraft needs an aircraft engine as the power to taxi to a designated position. However, the operation of the engine consumes fuel, and the accumulated consumption is huge, and does not meet the requirements of energy conservation and emission reduction. In addition, the running time of the aircraft engine impacts on the service life. Obviously, the service life of the aircraft engine can be effectively prolonged by minimizing the running time of the aircraft engine on the ground, and the purpose of saving energy and cost is also achieved.

SUMMARY

In view of this, the present disclosure provides an unmanned aircraft traction control system without a traction rod and an intelligent tractor.

In order to achieve the purpose, the technical scheme of the present disclosure is as follows.

In the first aspect, the present disclosure provides an unmanned aircraft traction control system without a traction rod, including:

after a tractor and an aircraft carry out wheel holding operation, an aircraft light identification and induction module, arranged at the tail of the tractor and used for acquiring an aircraft brightness signal in a man-machine interaction mode, wherein the aircraft brightness signal is a signal output by a pilot located in a cockpit of the aircraft after controlling an aircraft nose landing gear taxi light;

a main sensing system module, arranged on the tractor and used for acquiring an aircraft turning signal or an aircraft resistance signal in a man-machine interaction mode, wherein the aircraft turning signal is a signal output by a pilot located in the cockpit of the aircraft after controlling an aircraft turning system; the aircraft resistance signal is a signal output by a pilot located in the cockpit of the aircraft after controlling an aircraft braking system;

an aircraft sound identification and induction module, arranged at the tail of the tractor and used for acquiring an aircraft sound signal in a man-machine interaction mode, wherein the aircraft sound signal is a signal output by a pilot located in the cockpit of the aircraft after controlling an aircraft horn;

a control module, arranged on the tractor and used for:

in a man-machine interaction mode, outputting a first control command when receiving the aircraft brightness signal; the first control command is used for controlling the tractor to pull forward, so that the aircraft changes from a stop state to a forward traveling state;

outputting a second control command when receiving the aircraft turning signal; the second control command is used for controlling the tractor to turn and pull, so that the aircraft changes from a forward traveling state to a forward turning traveling state;

outputting a third control command when receiving the aircraft resistance signal; the third control command is used for controlling the tractor to brake, so that the aircraft changes from a forward traveling state to a stop state;

outputting a fourth control command when receiving the aircraft sound signal; the fourth control command is used for controlling the tractor to release a wheel holding mechanism, so that the aircraft is separated from the tractor.

Optionally, the system also includes a dispatching control center, used for controlling the tractor to reach a designated position. The designated position is an aircraft parking position or a taxiway position of a cleared active runway after landing.

Optionally, the dispatching control center, interacting information with an airport operation control center, is used for:

acquiring aircraft operation information sent by the airport operation control center; the aircraft operation information comprises take-off time, landing time, take-off and landing direction, a parking position, a runway and a taxiway;

determining a traveling track set of each tractor according to the aircraft operation information; the traveling track set comprises a traveling track reaching a designated position from a parking position, a traveling track reaching a destination from a designated position, and a traveling track reaching a parking position from a destination; the destination is the destination reached by the tractor pulling the aircraft.

Optionally, the system also includes a communication module installed on the tractor;

the dispatching control center, used for sending the traveling track set of the tractor to the communication module through 5G (fifth-generation) network signals or preset magnetic marker signals;

the communication module, used for sending the traveling track set of the tractor to the control module.

Optionally, the control module is also used for:

controlling the tractor to reach a designated position according to a traveling track from a parking position to a designated position, and controlling the tractor to complete wheel holding connection of front wheels of the aircraft;

controlling the tractor to pull the aircraft to a destination according to a traveling track from a designated position to a destination in an automatic control mode;

controlling the tractor to reach a parking position according to a traveling track from a destination to a parking position after the tractor releases the wheel holding mechanism and the aircraft is separated from the tractor.

Optionally, the dispatching control center is also used for:

receiving the first control command, the second control command, the third control command and the fourth control command output by the control module through the communication module;

outputting a stop command when a tractor traveling action corresponding to the first control command, the second control command, the third control command or/and the fourth control command does not conform to a target traveling action, and sending the stop command to the control module through the communication module; the target traveling action is a tractor traveling action after the traveling track at a designated position reaches a destination is decomposed;

the control module is used for controlling the tractor to brake according to a stop command.

Optionally, the system also includes a wheel holding sensing module installed on the tractor;

the control module, also used for outputting a working command of the wheel holding sensing module when the tractor reaches a designated position;

the wheel holding sensing module, used for adjusting wheel holding parameters of the wheel holding mechanism according to the working command of the wheel holding sensing module, so that the tractor can carry out wheel holding operation with the aircraft.

Optionally, the system also includes a wheel holding sensing module installed on the tractor;

the control module, used for outputting a working command of the wheel holding sensing module according to a wheel holding command sent by a ground operation worker;

the wheel holding sensing module, used for adjusting wheel holding parameters of the wheel holding mechanism according to the working command of the wheel holding sensing module, so that the tractor can carry out wheel holding operation with the aircraft.

Optionally, after the tractor and the aircraft carry out wheel holding operation, the distance between the aircraft light identification and induction module and the aircraft nose landing gear taxi light is less than or equal to a first target value.

After the tractor and the aircraft carry out wheel holding operation, the distance between the aircraft sound identification and induction module and the aircraft horn is less than or equal to a second target value.

In the second aspect, the present disclosure provides an intelligent tractor. The intelligent tractor includes a tractor and an unmanned aircraft traction control system without a traction rod in the first embodiment installed on the tractor.

Compared with the prior art, the present disclosure has the following advantages.

When the tractor and the aircraft carry out wheel holding operation, the brightness signal of the aircraft nose landing gear taxi light, the aircraft turning signal, the aircraft resistance signal and the aircraft horn signal are acquired through the aircraft light identification and induction module, the main sensing system module and the aircraft sound identification and induction module. Through the above signals, the purpose that a pilot can autonomously control the tractor to pull the aircraft is realized, the fuel is greatly saved, the shortage of airport ground crew is solved, the labor cost is really reduced, and the efficiency is improved.

BRIEF DESCRIPTION OF THE DRAWINGS

The present disclosure is further described with reference to the attached FIGURE.

DETAILED DESCRIPTION OF THE EMBODIMENTS

Figure 1:
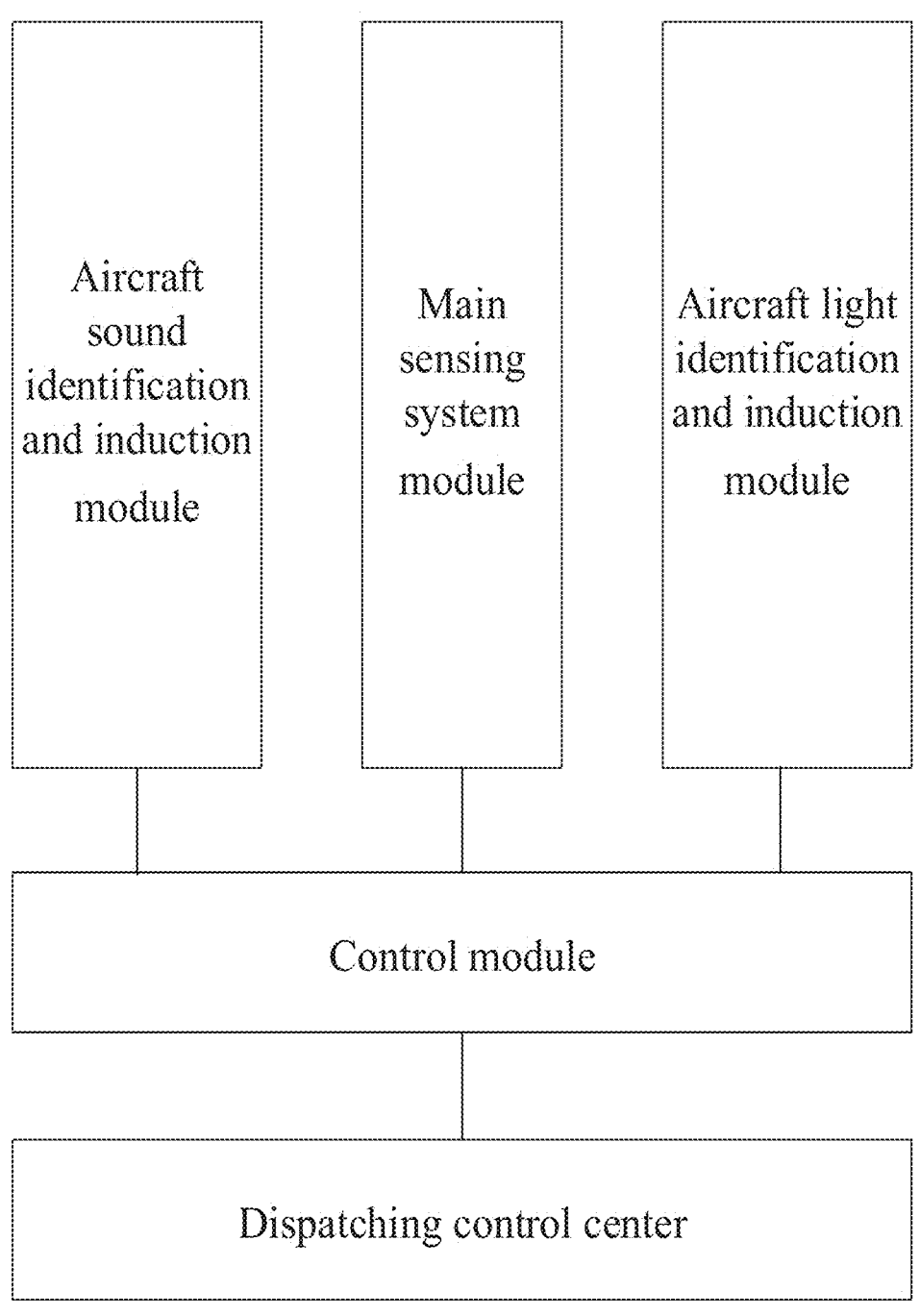
FIG. 1 is a structure diagram of an unmanned aircraft traction control system provided by the embodiment of the present disclosures.
Figure 2:
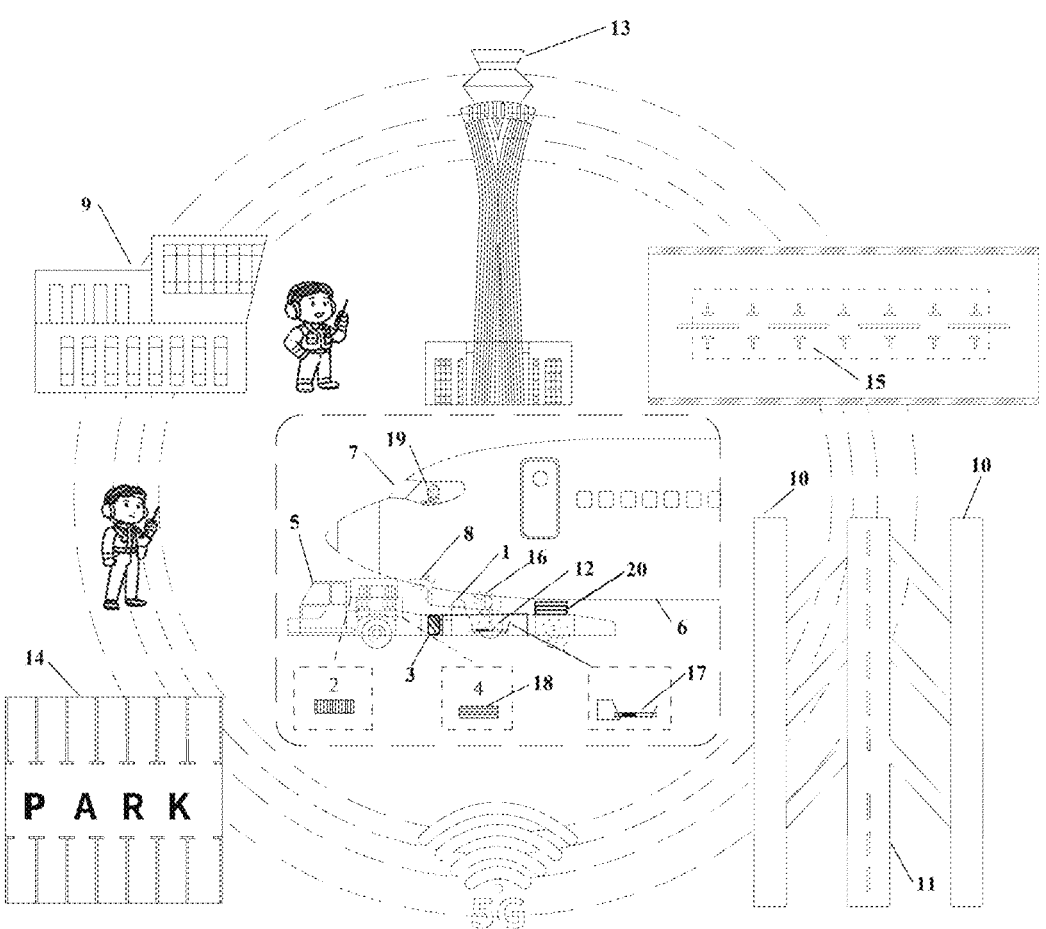
FIG. 2 is an overall schematic diagram of an unmanned aircraft traction control system provided by the present disclosure: where reference numerals in FIG. 2 are as follows: 1—aircraft light identification and induction module; 2—aircraft sound identification and induction module; 3—main sensing system module; 4—control module; 5—tractor; 6—aircraft; 7—cockpit; 8—aircraft horn; 9—dispatching control center; 10—taxiway; 11—runway; 12—front wheel; 13—airport operation control center; 34—tractor parking position; 15—present magnetic marker signals; 16—aircraft nose landing gear taxi light; 17—wheel holding mechanism, 18—communication module; 19—pilot, 20—wheel holding sensing module.
Figure 3:
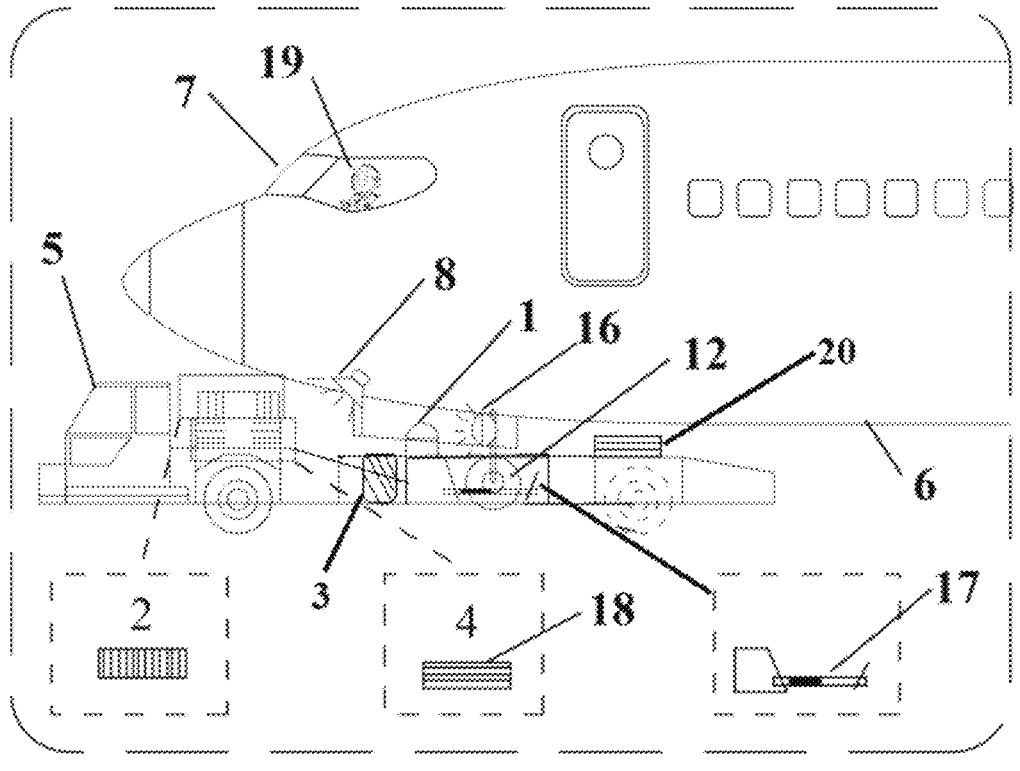
FIG. 3 is a partial enlarged schematic diagram of the unmanned aircraft traction control system of FIG. 2.

In order to minimize the operating time of an aircraft engine on the ground, a tractor technology is provided. The tractor technology is usually as follows. A driver drives a tractor, and a ground operation worker and a tower command worker command the pilot to pull an aircraft through the tractor. The disadvantages of this technology are as follows. A lot of manpower is required when the aircraft is pulled, the speed is slow, the efficiency low, and the cost is high.

In order to solve the problem, the following technologies are also provided.

A remote control tractor is provided. A ground operation worker controls the tractor with a remote controller to realize the actions of holding wheels and pulling the aircraft. This tractor is very convenient when the aircraft is maintained in a hangar or pulled on an airport apron, but man-machine interconnection cannot be realized, and cross connection among a tower, a pilot and the tractor when the tractor passes a taxiway before taking off and after landing cannot be realized.

An AI (Artificial Intelligence) controlled tractor is provided. An automatic aircraft pulling action can be realized in theory, but the action is not realistic in practical application, because the airport environment is complex. If the whole aircraft pulling process is realized by the tractor, the airport will change the existing operation rules, and once an accident occurs, manual intervention cannot be realized.

A taxiing system is provided. In a project of installing a taxiing system on A320 aircraft, an APU (Auxiliary Power Unit) power supply of the aircraft is used for driving electric motors on wheels of a main landing gear to taxi. However, this project is very difficult, because there is no driving system for all landing gears of the aircraft at present. Once this project is used, it is necessary to modify the landing gear and install driving equipment with the weight of 500 kg on the landing gear, so that the fuel consumption of the aircraft is increased. At present, the project only stays in the theoretical stage and has not been implemented.

In view of this, the present disclosure provides an unmanned aircraft traction control system without a traction rod and an intelligent tractor. The functions are as follows.

Firstly, the operating time of an aircraft engine on the ground is reduced as much as possible, so that the interval of corresponding inspection and maintenance work and the service life of the aircraft engine are prolonged. At the same time, the fuel consumption of the aircraft engine is greatly reduced, and carbon benefits are brought for airlines through energy conservation and emission reduction.

Secondly, the manipulation of the aircraft by a ground operation worker is reduced as much as possible, and the influence of human factors brought by the professional technical capability, psychological quality, vocational training level and psychological maturity of a ground operation worker is reduced.

Thirdly, the control right of the aircraft on the ground is ensured in the hands of a pilot to the maximum extent, the trained driving methods and habits are not changed, and potential safety risks do not exist.

Fourthly, supplemented by remote control of a ground operation worker, the manipulation of a pilot is primary, control logic and enabling control are added, and various protective measures such as direct interruption of priority action and manual emergency stop are issued by a dispatching control center to protect safe driving layer by layer.

Fifthly, through an automatic control mode and a man-machine interaction mode, the tractor is controlled to pull the aircraft to a destination.

Embodiment I

As shown in FIG. 1, an unmanned aircraft traction control system without a traction rod provided by the embodiment of the present disclosure includes:

a dispatching control center, used for controlling the tractor to reach a designated position; the designated position is an aircraft parking position or a taxiway position of a cleared active runway after landing;

after a tractor and an aircraft carry out wheel holding operation, an aircraft light identification and induction module, arranged at the tail of the tractor and used for acquiring an aircraft brightness signal in a man-machine interaction mode, wherein the aircraft brightness signal is a signal output by a pilot located in the cockpit of the aircraft after controlling an aircraft nose landing gear taxi light;

a main sensing system module, arranged on the tractor and used for acquiring an aircraft turning signal or an aircraft resistance signal in a man-machine interaction mode, wherein the aircraft turning signal is a signal output by a pilot located in the cockpit of the aircraft after controlling an aircraft turning system; the aircraft resistance signal is a signal output by a pilot located in the cockpit of the aircraft after controlling an aircraft braking system;

an aircraft sound identification and induction module, arranged at the tail of the tractor and used for acquiring an aircraft sound signal in a man-machine interaction mode, wherein the aircraft sound signal is a signal output by a pilot located in the cockpit of the aircraft after controlling an aircraft horn;

a control module, arranged on the tractor and used for:

in a man-machine interaction mode, outputting a first control command when receiving the aircraft brightness signal; the first control command is used for controlling the tractor to pull forward, so that the aircraft changes from a stop state to a forward traveling state;

outputting a second control command when receiving the aircraft turning signal; the second control command is used for controlling the tractor to turn and pull, so that the aircraft changes from a forward traveling state to a forward turning traveling state;

outputting a third control command when receiving the aircraft resistance signal; the third control command is used for controlling the tractor to brake, so that the aircraft changes from a forward traveling state to a stop state;

outputting a fourth control command when receiving the aircraft sound signal; the fourth control command is used for controlling the tractor to release a wheel holding mechanism, so that the aircraft is separated from the tractor.

In the embodiment of the present disclosure, under the cooperation of airports, a tractor dispatching control center is established in each airport, and the dispatching control center is linked with an airport operation control center, so that the information such as take-off time, landing time, take-off and landing direction, parking position, take-off and landing runway of each aircraft can be clearly known, and the tractor can arrive at the corresponding place at the corresponding time to pick up and drop off the aircraft through the commands sent by the dispatching control center. Wherein, the dispatching control center communicates with a communication module on the tractor through 5G network signals, preset magnetic nail signals and other signals to transmit command signals, position information and the like.

Further, the aircraft traction control system provided by the embodiment of the present disclosure also includes a communication module installed on the tractor.

The dispatching control center, interacting information with an airport operation control center, is used for:

acquiring aircraft operation information sent by the airport operation control center; the aircraft operation information comprises take-off time, landing time, take-off and landing direction, a parking position, a runway and a taxiway;

determining a traveling track set of each tractor according to the aircraft operation information; the traveling track set comprises a traveling track reaching a designated position from a parking position, a traveling track reaching a destination from a designated position, and a traveling track reaching a parking position from a destination; the destination is the destination reached by the tractor pulling the aircraft;

sending the traveling track set of the tractor to the communication module through 5G network signals or preset magnetic marker signals;

p the communication module, used for sending the traveling track set of the tractor to the control module.

The control module is used for:

controlling the tractor to reach a designated position according to a traveling track from a parking position to a designated position, and controlling the tractor to complete wheel holding connection of front wheels of the aircraft;

controlling the tractor to pull the aircraft to a destination according to a traveling track from a designated position to a destination in an automatic control mode;

controlling the tractor to reach a parking position according to a traveling track from a destination to a parking position after the tractor releases the wheel holding mechanism and the aircraft is separated from the tractor.

In the embodiment of the present disclosure, the main sensing system module mainly senses the operation of a hand wheel and a foot pedal of a pilot in the cockpit after front wheels of the aircraft and front landing gears of the aircraft are picked up. Specifically, after a force sensor senses the change of force, a force signal is converted into a corresponding angle signal, so that the left turning, right turning or braking of the tractor is realized, and the aircraft is pulled to complete the corresponding action.

In the embodiment of the present disclosure, the aircraft light identification and induction module identifies the brightness of the aircraft nose landing gear taxi light with special technology, and is used for a pilot to operate the tractor to start traction, set braking and the like. Collection, light spectrum and brightness analysis are carried out on the light of the tax light of the craft, light spectrum and brightness are analyzed, and electrical signals are converted by using existing light collection and conversion devices to realize corresponding indication and control.

At this time, the distance between the aircraft light identification and induction module and the aircraft nose landing gear taxi light is less than or equal to a first target value. Preferably, the first target value is 1 m, 2 m, 3 m, 4 m and the like. As long as the distance between the aircraft light identification and induction module and the aircraft nose landing gear taxi light can make the aircraft light identification and induction module accurately acquire a brightness signal of the aircraft nose landing gear taxi light.

In the embodiment of the present disclosure, the aircraft sound identification and induction module identifies cabin horn sound of the aircraft nose landing gear taxi light with special technology, and is used for a pilot to control the tractor to release the wheel holding mechanism. Collection, analysis and voiceprint identification of aircraft horn sound signals are carried out, and voiceprint identification technology is applied to conversion into electrical signals to realize corresponding indication and control.

At this time, the distance between the aircraft sound identification and induction module and the aircraft horn is less than or equal to a second target value. Preferably, the second target value is 1 m, 2 m, 3 m, 4 m and the like. As long as the distance between the aircraft sound identification and induction module and the aircraft horn can make the aircraft sound identification and induction module accurately acquire a sound signal output by the aircraft horn.

In the embodiment of the present disclosure, the wheel holding mechanism is equipped with a special sensing system to identify the size of the front wheels of different aircrafts, wheel holding parameters are automatically adjusted, the front wheels are automatically approached, and wheel holding, wheel releasing and other actions are completed under the control of commands.

Further, the aircraft traction control system provided by the embodiment of the present disclosure also includes a wheel holding sensing module arranged on the tractor;

the control module, also used for outputting a working command of the wheel holding sensing module when the tractor reaches a designated position;

the wheel holding sensing module, used for adjusting wheel holding parameters of the wheel holding mechanism according to the working command of the wheel holding sensing module, so that the tractor can carry out wheel holding operation with the aircraft.

In the embodiment of the present disclosure, the tractor and the aircraft can be controlled to carry out wheel holding operation through the remote control mode of a ground operation worker.

Further, the aircraft traction control system provided by the embodiment of the present disclosure also includes a wheel holding sensing module arranged on the tractor;

the control module, used for outputting a working command of the wheel holding sensing module according to a wheel holding command sent by a ground operation worker;

the wheel holding sensing module, used for adjusting wheel holding parameters of the wheel holding mechanism according to the working command of the wheel holding sensing module, so that the tractor can carry out wheel holding operation with the aircraft.

In the embodiment of the present disclosure, when a pilot operates in fault obviously or in failure, the dispatching control center can control the tractor to stop urgently preferentially.

Further, the dispatching control center is also used for:

receiving the first control command, the second control command, the third control command and the fourth control command output by the control module through the communication module;

outputting a stop command when a tractor traveling action corresponding to the first control command, the second control command, the third control command or/and the fourth control command does not conform to a target traveling action, and sending the stop command to the control module through the communication module; the target traveling action is a tractor traveling action after the traveling track at a designated position reaches a destination is decomposed;

the control module is used for controlling the tractor to brake according to a stop command.

In the embodiment of the present disclosure, the tractor is also provided with a power module, a motor system, a hydraulic system, a wheel holding mechanism and other parts to realize various tasks of the tractor.

A using method of the above control system is as follows.

1. At the parking position of the aircraft 1.1 The dispatching control center dispatches the tractor to a designated position, a front wheel turning bypass pin is manually inserted, the front wheels of the aircraft are approached in correct postures by remote control, and the front wheels of the aircraft are fixed on the wheel holding mechanism by using a push rod mechanism. After the front wheels are held, the tractor extends forward and an indicator light board is erected, on which a green indicator light is always on. After seeing that the green indicator light is always on, a pilot can make corresponding operations such as brake releasing in the cockpit of the aircraft, and then the aircraft is pushed away from a gallery bridge to enter the taxiway by manual remote control, and the front wheel turning bypass pin is pulled off.

Alternatively, 1.1 The dispatching control center dispatches the tractor to a designated position, a front wheel turning bypass pin is manually inserted, the front wheels of the aircraft are approached in correct postures automatically, and the front wheels of the aircraft are fixed on the wheel holding mechanism by using a push rod mechanism. After the front wheels are held, the tractor extends forward and an indicator light board is erected, on which a green indicator light is always on. After seeing that the green indicator light is always on, a pilot can make corresponding operations such as brake releasing in the cockpit of the aircraft, and then the aircraft is pushed away from a gallery bridge to enter the taxiway by manual remote control, and the front wheel turning bypass pin is pulled off.

1.2 After the aircraft is pushed to the taxiway, a ground operation worker can show that the front wheel turning bypass pin has been pulled out. After seeing the situation, a pilot controls the tractor through the manipulation in the cockpit of the aircraft or the commands output by the dispatching control center. There are three situations: forward moving, turning and stopping.

(1) When the aircraft needs to change from a stop state to a forward traveling state, the aircraft can be controlled in two ways. First, the dispatching control center can transmit control commands to the tractor through 5G signals. Second, a pilot flashes the nose landing gear taxi light, and the tractor starts to pull forward after receiving the light signal.

(2) When the aircraft needs to turn, the aircraft can be controlled in two ways: First, the dispatching control center can transmit control commands to the tractor through 5G signals. Second, by controlling the aircraft turning system, such as operating the hand wheel or the pedal, a pilot turns the front wheels to the left or right, and wheels of the nose landing gear can make corresponding turning actions, and the main sensing system module of the tractor is driven to transmit turning signals to the tractor, so that the purpose of turning is achieved.

(3) When the aircraft needs to park, the aircraft can be controlled in two ways. First, the dispatching control center can transmit control commands to the tractor through 5G signals. Second, when the pilot steps on the brake of the aircraft, the main sensing system module of the tractor controls the stopping of the tractor when sensing the sudden increase of resistance. The tractor gives feedback that a red indicator light is always on to the pilot, and the pilot should brake.

(4) After the tractor pulls the aircraft in place and a pilot steps on the brake, the aircraft can be controlled in two ways: First, the dispatching control center can transmit control commands to the tractor through 5G signals. Second, a pilot transmits a sound signal through the horn in the cockpit. After the tractor identifies and receives the signal, the wheel holding mechanism begins to be started. After the wheel holding mechanism is completely released, the tractor drives away, and a yellow indicator light on the top of the tractor flashes to remind a pilot that the tractor has driven away.

(5) After the traction is completed, the tractor automatically enters an airport patrol road and drives back to the parking position according to a programmed route, and then enters a standby state or a charging maintenance state.

2. The aircraft leaves the runway and enters the taxiway after landing.

When the aircraft leaves the runway after landing, the dispatching control center controls the tractor to reach the aircraft to be pulled automatically through 5G control signals, the front wheel turning bypass pin is manually inserted, the front wheels of the craft are approached in correct postures by remote control or automatically, and the front wheels of the craft are fixed on the wheel holding mechanism by using a push rod mechanism. After the front wheels are held, the tractor extends forward and an indicator light board is erected, on which a green indicator light is always on. After seeing that the green indicator light is always on, a pilot can make corresponding operations such as brake releasing in the cockpit of the aircraft.

In the process of pulling the aircraft, there are three situations: forward moving, turning and stopping.

(1) When the aircraft needs to change from a stop state to a forward traveling state, the aircraft can be controlled in two ways. First, the dispatching control center can transmit control commands to the tractor through 5G signals. Second, a pilot flashes the nose landing gear taxi light, and the tractor starts to pull forward after receiving the light signal.

(2) When the aircraft needs to turn, the aircraft can be controlled in two ways: First, the dispatching control center can transmit control commands to the tractor through 5G signals. Second, by controlling the aircraft turning system, such as operating the hand wheel or the pedal, a pilot turns the front wheels to the left or right, and wheels of the nose landing gear can make corresponding turning actions, and the main sensing system module of the tractor is driven to transmit turning signals to the tractor, so that the purpose of turning is achieved.

(3) When the aircraft needs to park, the aircraft can be controlled in two ways. First, the dispatching control center can transmit control commands to the tractor through 5G signals. Second, when the pilot steps on the brake of the aircraft, the main sensing system module of the tractor controls the stopping of the tractor when sensing the sudden increase of resistance. The tractor gives feedback that a red indicator light is always on to the pilot, and the pilot should brake.

(4) After the tractor pulls the aircraft in place and a pilot steps on the brake, the aircraft can be controlled in two ways: First, the dispatching control center can transmit control commands to the tractor through 5G signals. Second, a pilot transmits a sound signal through the horn in the cockpit. After the tractor identifies and receives the signal, the wheel holding mechanism begins to be started. After the wheel holding mechanism is completely released, the tractor drives away, and a yellow indicator light on the top of the tractor flashes to remind a pilot that the tractor has driven away.

(5) After the traction is completed, the tractor automatically enters an airport patrol road and drives back to the parking position according to a programmed route, and then enters a standby state or a charging maintenance state.

3. When the aircraft needs to retreat, the ground operation worker can control the tractor by remote control, and then the aircraft retreats.

Embodiment II

The embodiment of the present disclosure provides an intelligent tractor. The intelligent tractor includes a tractor and an unmanned aircraft traction control system without a traction rod in the first embodiment installed on the tractor.

The technical characteristics of the present disclosure are as follows.

Firstly, the tractor has a remote control function and can be driven by a driver directly. When the aircraft is pushed out of the parking position, the aircraft is pushed out by a driver or a ground operation worker remotely.

Secondly, the tractor uses an integrated navigation system that is not limited to 5G, magnetic markers, manual technology and other technologies to control all actions on the traction side, such as forward moving, acceleration, deceleration, stopping and turning, and can also control the functions of the tractor such as wheel holding and wheel releasing.

Thirdly, when the aircraft is pulled, the tractor can make corresponding actions according to the operation of a pilot, so that man-machine interconnection is realized, the risk of the tractor is greatly reduced, and the traditional taxiing mode is not changed.

Fourthly, the tractor is equipped with a comprehensive sensing system that is not limited to millimeter wave radar, visual perception, laser radar and other technologies. Obstacles on the road ahead can be detected, a warning is sent to the intelligent tractor for the control officer (remind the personnel of paying attention to), automatic or manual intervention is used for avoiding obstacles and sending a warning to the control officer.

Fifthly, there is an airport road terrain database in the tractor, and the tractor has the function of automatic positioning, and an aircraft to be pulled can be found according to instructions and automatically pulled to a designated position.

Sixthly, when a control signal received by the tractor conflicts with a signal given a pilot, the signal given by a pilot has priority.

In the present disclosure, unmanned modification is carried out on the tractor without limitation of 5G technology, magnetic marker technology, man-machine interaction technology and automatic driving. The tractor can be controlled by a pilot on the aircraft, or an unmanned tractor can be automatically dispatched by the system without the participation of a pilot, and the aircraft can be pulled directly from a landing position or a parking position to a designated position.

The above embodiments are provided only for the purpose of describing the present disclosure, and are not intended to limit the scope of the present disclosure. The scope of the present disclosure is defined by the appended claims. Various equivalent substitutions and modifications made without departing from the spirit and principle of the present disclosure should be included in the scope of the present disclosure.

What is claimed is:

1. An unmanned aircraft traction control system, comprising:

an aircraft light identification and induction module arranged at a tail of a tractor and used for acquiring an aircraft brightness signal in a man-machine interaction mode, wherein the aircraft brightness signal is a signal output by a pilot located in a cockpit of the aircraft after controlling an aircraft nose landing gear taxi light;

a main sensing system module, arranged on the tractor and used for acquiring an aircraft turning signal or an aircraft resistance signal in the man-machine interaction mode, wherein the aircraft turning signal is a signal output by the pilot located in the cockpit of the aircraft after controlling an aircraft turning system; the aircraft resistance signal is a signal output by the pilot located in the cockpit of the aircraft after controlling an aircraft braking system;

an aircraft sound identification and induction module, arranged at the tail of the tractor and used for acquiring an aircraft sound signal in the man-machine interaction mode, wherein the aircraft sound signal is a signal output by the pilot located in the cockpit of the aircraft after controlling an aircraft horn; and a control module, arranged on the tractor and used for:

in the man-machine interaction mode, outputting a first control command when receiving the aircraft brightness signal; the first control command is used for controlling the tractor to pull forward, so that the aircraft changes from a stop state to a forward traveling state;

outputting a second control command when receiving the aircraft turning signal; the second control command is used for controlling the tractor to turn and pull, so that the aircraft changes from the forward traveling state to a forward turning traveling state;

outputting a third control command when receiving the aircraft resistance signal; the third control command is used for controlling the tractor to brake, so that the aircraft changes from the forward traveling state to the stop state; and outputting a fourth control command when receiving the aircraft sound signal; the fourth control command is used for controlling the tractor to release a wheel holding mechanism, so that the aircraft is separated from the tractor.

2. The unmanned aircraft traction control system according to claim 1, further comprising a dispatching control center used for controlling the tractor to reach a designated position, wherein the designated position is an aircraft parking position or a taxiway position of a cleared active runway after landing.

3. The unmanned aircraft traction control system according to claim 2, wherein the dispatching control center, interacting information with an airport operation control center:

acquires aircraft operation information sent by the airport operation control center; the aircraft operation information comprises take-off time, landing time, take-off and landing direction, the aircraft parking position, a runway and a taxiway; and determines a traveling track set of each tractor according to the aircraft operation information; the traveling track set comprises a first traveling track reaching the designated position from a tractor parking position, a second traveling track reaching a destination from the designated position, and a third traveling track reaching the tractor parking position from the destination; the destination is the destination reached by the tractor pulling the aircraft.

4. The unmanned aircraft traction control system according to claim 3, further comprising a communication module installed on the tractor;

the dispatching control center sending the traveling track set of the tractor to the communication module through 5G (fifth-generation) network signals or preset magnetic marker signals; and the communication module sending the traveling track set of the tractor to the control module.

5. The unmanned aircraft traction control system according to claim 4, wherein the control module:

controls the tractor to reach the designated position according to the first traveling track from the tractor parking position to the designated position, and controlling the tractor to complete wheel holding connection of front wheels of the aircraft; the preset magnetic marker used to align the wheel holding mechanism and nose wheel;

controls the tractor to pull the aircraft to the destination according to the second traveling track from the designated position to the destination in an automatic control mode;

controls the tractor to reach the tractors parking position according to the third traveling track from the destination to the tractor parking position after the tractor releases the wheel holding mechanism and the aircraft is separated from the tractor.

6. The unmanned aircraft traction control system according to claim 2, further comprising a wheel holding sensing module arranged on the tractor;

the control module outputting a working command of the wheel holding sensing module when the tractor reaches the designated position; the preset magnetic marker used to align the wheel holding mechanism and nose wheel;

the wheel holding sensing module adjusting wheel holding parameters of the wheel holding mechanism according to the working command of the wheel holding sensing module, so that the tractor can carry out wheel holding operation with the aircraft.

7. The unmanned aircraft traction control system according to claim 1, further comprising a wheel holding sensing module arranged on the tractor;

the control module outputting a working command of the wheel holding sensing module according to a wheel holding command sent by a ground operation worker;

the wheel holding sensing module adjusting wheel holding parameters of the wheel holding mechanism according to the working command of the wheel holding sensing module, so that the tractor can carry out wheel holding operation with the aircraft.

8. The unmanned aircraft traction control system according to claim 1, wherein after the tractor and the aircraft carry out a wheel holding operation, a distance between the aircraft light identification and induction module and the aircraft nose landing gear taxi light is less than or equal to a first target value;

after the tractor and the aircraft carry out wheel holding operation, a distance between the aircraft sound identification and induction module and the aircraft horn is less than or equal to a second target value.

9. An intelligent tractor, comprising the tractor and the unmanned aircraft traction control system installed on the tractor according to claim 1.

10. The intelligent tractor according to claim 9, further comprising a dispatching control center for controlling the tractor to reach a designated position, wherein the designated position is an aircraft parking position or a taxiway position of a cleared active runway after landing.

11. The intelligent tractor according to claim 10, wherein the dispatching control center, interacting information with an airport operation control center:

acquires aircraft operation information sent by the airport operation control center; the aircraft operation information comprises take-off time, landing time, take-off and landing direction, the aircraft parking position, a runway and a taxiway;

determines a traveling track set of each tractor according to the aircraft operation information; the traveling track set comprises a first traveling track reaching the designated position from a tractor parking position, a second traveling track reaching a destination from the designated position, and a third traveling track reaching the tractor parking position from the destination; the destination is the destination reached by the tractor pulling the aircraft.

12. The intelligent tractor according to claim 11, further comprising a communication module installed on the tractor;

the dispatching control center sending the traveling track set of the tractor to the communication module through 5G (fifth-generation) network signals or preset magnetic marker signals;

the communication module sending the traveling track set of the tractor to the control module.

13. The intelligent tractor according to claim 12, wherein the control module is also used for:

controlling the tractor to reach the designated position according to the first traveling track from the tractor parking position to the designated position, and controlling the tractor to complete wheel holding connection of front wheels of the aircraft;

controlling the tractor to pull the aircraft to the destination according to the second traveling track from the designated position to the destination in an automatic control mode; and controlling the tractor to reach the tractor parking position according to the third traveling track from the destination to the tractor parking position after the tractor releases the wheel holding mechanism and the aircraft is separated from the tractor.

14. The intelligent tractor according to claim 10, further comprising a wheel holding sensing module arranged on the tractor;

the control module outputting a working command of the wheel holding sensing module when the tractor reaches the designated position; and the wheel holding sensing module adjusting wheel holding parameters of the wheel holding mechanism according to the working command of the wheel holding sensing module, the preset magnetic marker used to align the wheel holding mechanism and nose wheel; so that the tractor can carry out wheel holding operation with the aircraft.

15. The intelligent tractor according to claim 9, further comprising a wheel holding sensing module arranged on the tractor;

the control module outputting a working command of the wheel holding sensing module according to a wheel holding command sent by a ground operation worker;

the wheel holding sensing module adjusting wheel holding parameters of the wheel holding mechanism according to the working command of the wheel holding sensing module, so that the tractor can carry out wheel holding operation with the aircraft.

16. The intelligent tractor according to claim 9, wherein after the tractor and an aircraft carry out wheel holding operation, a distance between the aircraft light identification and induction module and the aircraft nose landing gear taxi light is less than or equal to a first target value; and after the tractor and the aircraft carry out wheel holding operation, a distance between the aircraft sound identification and induction module and the aircraft horn is less than or equal to a second target value.

* * * * *